United States Patent
LaFave

(10) Patent No.: US 10,888,404 B2
(45) Date of Patent: Jan. 12, 2021

(54) TEETH FLOSSING WEDGE

(71) Applicant: Paul A. LaFave, East Amherst, NY (US)

(72) Inventor: Paul A. LaFave, East Amherst, NY (US)

( * ) Notice: Subject to any disclaimer, the term of this patent is extended or adjusted under 35 U.S.C. 154(b) by 314 days.

(21) Appl. No.: 13/835,457

(22) Filed: Mar. 15, 2013

(65) Prior Publication Data

US 2013/0269725 A1 Oct. 17, 2013

(51) Int. Cl.
*A61C 15/04* (2006.01)

(52) U.S. Cl.
CPC .................... *A61C 15/041* (2013.01)

(58) Field of Classification Search
CPC ....... A61C 15/02; A61C 15/04; A61C 15/041; A61C 15/042
See application file for complete search history.

(56) References Cited

U.S. PATENT DOCUMENTS

| | | | | |
|---|---|---|---|---|
| 1,451,380 A * | 4/1923 | Thum | | 132/329 |
| 3,101,727 A * | 8/1963 | Wiseman | | A61C 15/02 |
| | | | | 132/329 |
| 4,304,245 A * | 12/1981 | Lichfield | | A61C 15/02 |
| | | | | 132/321 |
| 4,570,653 A * | 2/1986 | Wolf | | 132/329 |
| 4,878,508 A * | 11/1989 | Durbin | | A61C 15/00 |
| | | | | 132/329 |
| 5,507,646 A * | 4/1996 | Roth | | A61C 15/00 |
| | | | | 132/321 |
| 5,875,798 A * | 3/1999 | Petrus | | A61C 15/02 |
| | | | | 132/321 |
| 6,012,468 A * | 1/2000 | Huang | | A61C 15/02 |
| | | | | 132/309 |
| 6,220,258 B1 * | 4/2001 | Briggs et al. | | 132/329 |
| 8,177,553 B2 * | 5/2012 | Stoll | | A61C 5/85 |
| | | | | 132/329 |

FOREIGN PATENT DOCUMENTS

CH 604677 * 9/1978

* cited by examiner

*Primary Examiner* — Rachel R Steitz
*Assistant Examiner* — Brianne E Kalach
(74) *Attorney, Agent, or Firm* — Law Office of Vincent LoTempio, PLLC; Vincent G. LoTempio; David T. Stephenson

(57) ABSTRACT

The invention presented is a wedge-shaped flossing device the body of which includes a tapered top edge extending between the first end and the second end and a bottom edge extending perpendicularly from said first end to said second end. A cleaning point is formed by the second end and a lead point extends below the bottom edge. The bottom edge of the device may incorporate a guide groove. The device can be disposable and may be coated with appropriate dental coatings.

12 Claims, 9 Drawing Sheets

TEETH FLOSSING WEDGE

FIELD OF THE INVENTION

The invention relates generally to the field of dental hygiene, more particularly to cleaning device, and still more particularly to the field of personal flossing devices to clean between individual teeth.

BACKGROUND OF THE INVENTION

Flossing is a well known method of cleaning teeth and is highly recommended to be included in a personal program of dental hygiene. Traditionally, flossing is performed by inserting a silk or nylon thread between a pair of adjacent teeth and shifting the thread back and forth between the teeth to loosen and remove particles not reached in the course of cleaning with a toothbrush. Some floss is coated with wax to enable easier insertion between teeth having narrow gaps between the teeth.

While regular flossing can improve or maintain dental health, the use of flossing thread or string can present a problem to the user, namely the flossing thread itself. It can be easily broken requiring the user to unwind additional thread leading to waste. In addition, the use of floss can be inconvenient and it is often difficult to discreetly use and dispose of used flossing thread.

Different devices have been proposed to overcome these drawbacks. U.S. Pat. No. 6,085,761 to Inaba discloses a dental cleaning device in the shape of a modified toothpick with a rectangular handle portion attached to a tapered and narrowing cleaning portion that forms into a point. The cleaning portion includes raised resilient knobs that supply a cleaning action when wedged between two teeth. However, the cleaning area for the toothpick is tapered and provides a very small cleaning area on the toothpick itself.

U.S. Pat. No. 6,402,514 to Fischer, et al. discloses a dental wedge with a handle at one end formed from a body that narrows to a blunt point. The body has thinner and thicker regions and is fabricated from a resilient material or materials. When the body is fit between two teeth, the resilient body is compressed to conform to the shape of the teeth and thus rubs closely against the surface of the target tooth. However, the instrument is designed to act as a wedge to hold dental matrix in place during filling of a cavity. As such, it retains material rather than helping to remove particles from between teeth.

U.S. Pat. No. 6,701,939 to Freemen discloses an elongated dental device with tapered cleaning ends and a center handle section. One of the ends is thicker than the other. The thicker end can be used to dislodge most food while the thinner end can fit between two snugly fit adjacent teeth. One or more ends may be roughened. However, the Fischer device is made of plastic making it rigid and less flexible for inserting between teeth and restricting its cleaning action to the region between adjacent teeth.

U.S. Pat. No. 7,669,607 to Torres, et al. discloses an interdental device that includes four different cleaning zones that can each support a different type of cleaning compound or structure. Each zone varies in thickness to allow it to be wedged between teeth having different gaps. In one embodiment the corner of each zone is tapered. However, like the Fischer device, the interdental device from Torres is fabricated from plastic and possesses the disadvantage a relatively large-sized device that is inserted between the teeth. In addition, in using the Torres device, it is likely that more than one cleaning zone will be used increasing the time needed to floss all of the teeth. Its rigid plastic construction reduces the flexibility needed to floss the front and back surfaces of the teeth.

The material used to fabricate the above devices indicates they will be relatively expensive and thus retained for reuse by the user. This requires that they be stored in a sanitary environment such as a case, often making them inconvenient to store and carry in public.

What is needed then is a flossing device that is flexible so as to be able to clean some or all of the back and front surfaces of each tooth as well as the region between adjacent teeth. In a preferred embodiment, the device would also be disposable.

SUMMARY OF THE INVENTION

A wedge-shaped teeth flossing device comprising a body, the body including a first end; a second end including a following point; a tapered top edge extending between the first end and the second end; a bottom edge extending perpendicularly from the first end to the second end; a lead point extending below the bottom edge; and, a cleaning point formed from the second end. In a preferred embodiment, the flossing device includes a guide groove formed in its bottom edge to act as a guide in enabling the user to more easily place the thinnest part of the device between two adjacent teeth.

One object of the invention is to provide a flossing device that is disposable.

A second object of the invention is to supply a flossing device that can easily be manipulated by one hand.

A third object of the invention is to offer a flossing device with sufficient flexibility to maneuver between individual teeth to satisfactorily remove waste matter.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

Figure 1A:
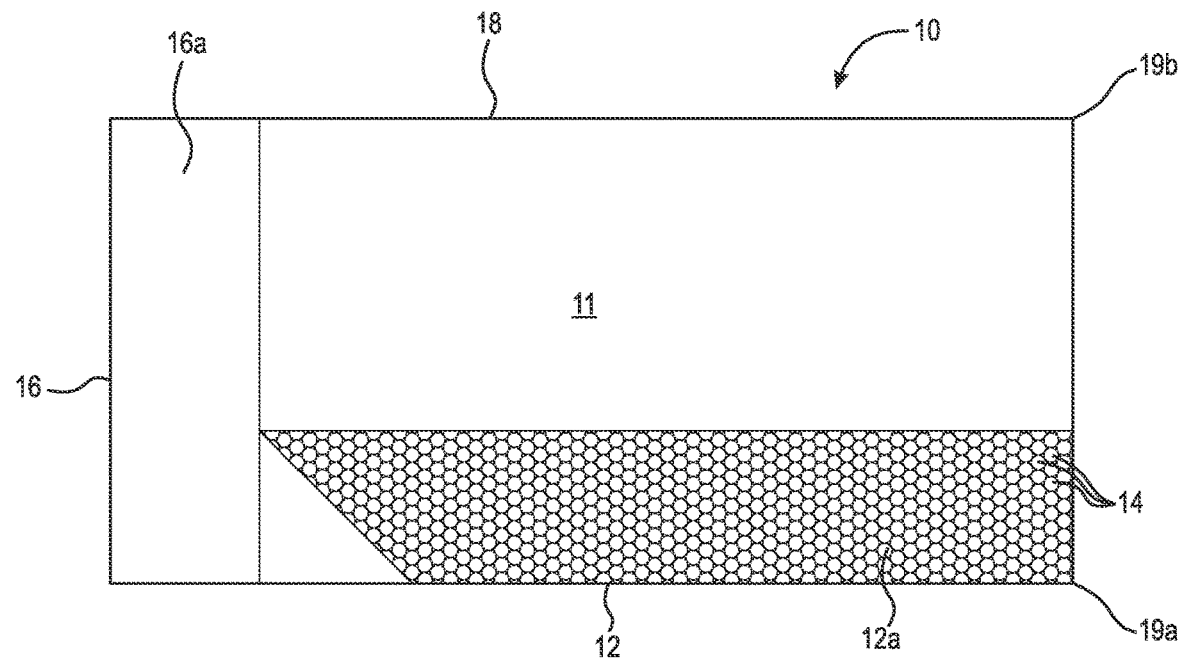
FIG. 1a depicts a front view of the flossing device of the present invention in an unfolded condition.

Adverting to the drawings, FIG. 1a depicts a front view of flossing device 10 ("device 10") in an unfolded condition. On front side 11, in a preferred embodiment region 12a proximate to a bottom edge 12 forms a textured surface. The device may be fabricated from a suitable plastic film, similar to transparent adhesive tape having the strength to be inserted between adjacent teeth and flexibility to be moved and manipulated between the teeth at different angles. In an alternate embodiment, it may be fabricated from a suitable paper. In both embodiments, it is preferred, but not necessary, that device 10 is disposable.

Figure 1B:
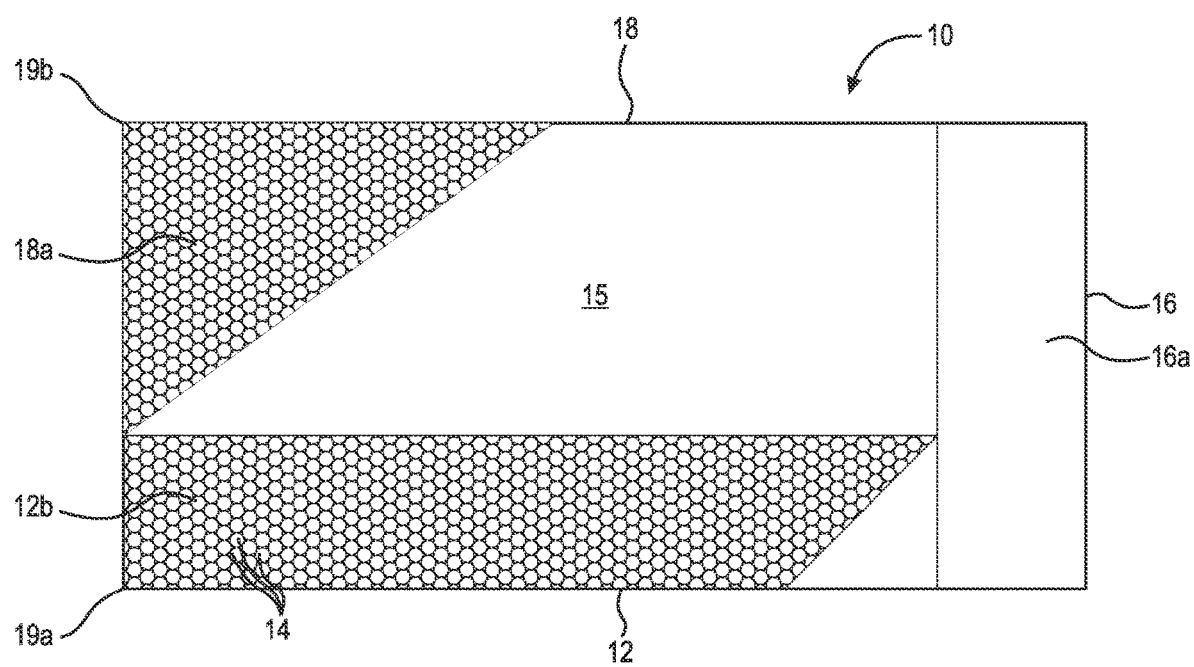
FIG. 1b depicts a rear view of the flossing device showing the rear side of the device.

In the embodiment shown, a plurality of dots or spots 14 form the textured surface that is preferably "sticky" or slightly adhesive similar to the adhesives used for POST-IT® Notes by 3M, St. Paul, Minn. One suitable embodiment of adhesive is described in U.S. Pat. No. 3,691,140 to Silver which is hereby incorporated by reference in its entirety. An alternate adhesive may be the pressure sensitive adhesive used in tapes such as SCOTCH TAPE® which uses an acrylic or rubber based adhesive known to those having skill in the art. Side edge 16 forms one side of device 10 that lacks the textured surface on both front side 11 and rear side 21 (not seen in FIG. 1). Side edge 19 opposes side edge 16. As discussed below, this untextured or "smooth" region 16a may act as a handle when device 10 is utilized to clean between teeth. In one embodiment, region 16a may be thicker than the remaining areas of unfolded flossing device 10. FIG. 1b depicts a rear view of device 10 showing rear side 15 with two additional textured areas, region 12b, opposing region 12a, and region 18a. Similar or identical to region 12a, a plurality of spots 14 form the textured surfaces of regions 12b and 18a.

Figure 2:
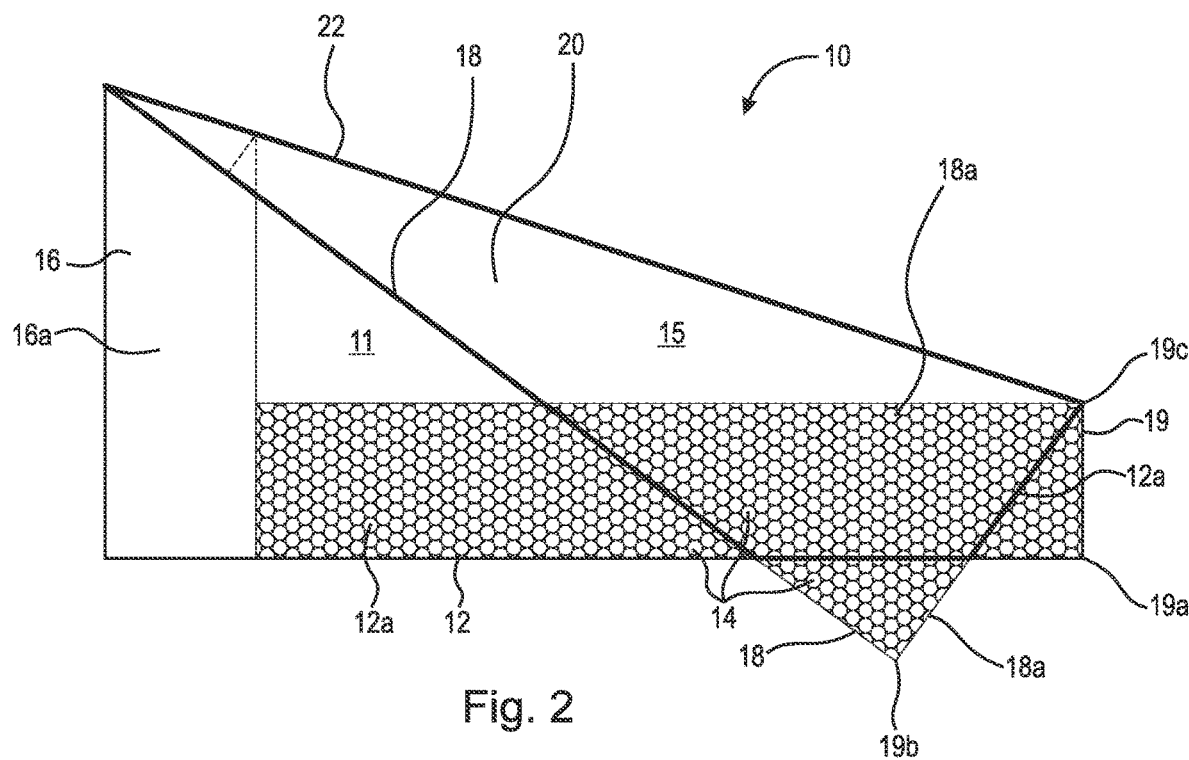
FIG. 2 is a front view of the device folded into an operational configuration or shape.

FIG. 2 is a front view of device 10 folded into the wedge-shaped operational configuration for when it is used. Rear side 15 is folded along diagonal or top edge 22 to partially cover front side 11 region. It can be seen that textured region 18a partially covers region 12a to form textured points—cleaning point 19a and lead point 19b, as well as follow point 19c. In one embodiment, because of the configuration of folded device 10, the thickness of area 20, bounded by the bold lines in FIG. 2, is twice that of the remaining areas of device 10. This doubled thickness, coupled with textured regions 12a, 12b (not seen in FIG. 2), and 18a more efficiently enables device 10 to remove unwanted food particles and other waste when inserted between two teeth as described below. In one embodiment, device 10, including all or portions of sides 11 and 15 and points 19a, 19b, and 19c may be coated with antimicrobial and/or antidecay dental material(s) such as fluorides similar to coatings for string-type dental floss.

Figure 3:
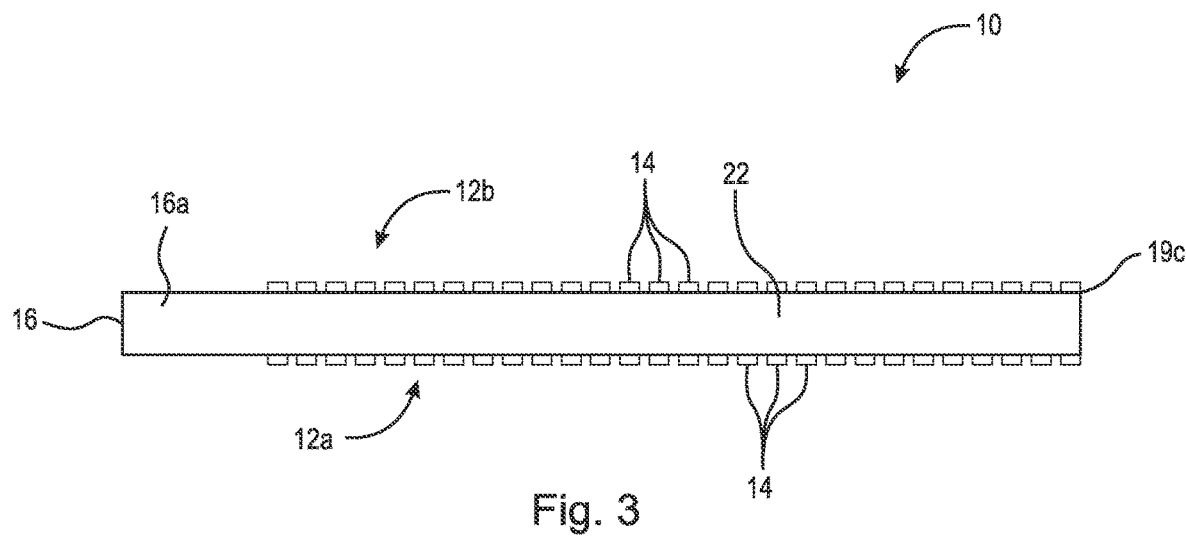
FIG. 3 is a top view of the flossing device after it is folded into the operational shape along the fold line.

FIG. 3 is a top view of flossing device 10. Edge 16 is shown along with the top of smooth region 16a. Spots 14 are seen from both regions 12a and 12b. Also seen is top edge 22 and following point 19c opposite edge 16.

Figure 4:
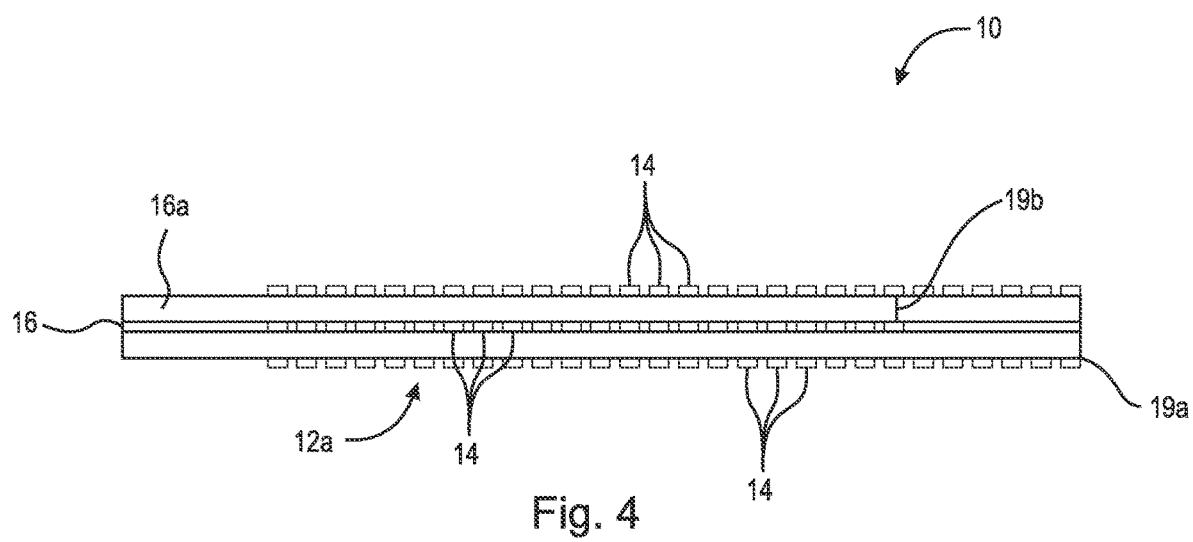
FIG. 4 is a bottom view of the flossing device in the operational configuration demonstrating the double area of the folded device.

FIG. 4 is a bottom view of wedge-shaped device 10 in the operational configuration demonstrating the doubled thickness of area 20 of device 10. It can be seen that cleaning point 19a and lead point 19b are outside of area 20 and have only a single thickness. This reduced thickness allows a user to more easily insert one or both points 19a and 19b between two adjacent teeth. The increased thickness of area 20 will force textured or sticky regions 12a, 12b, and 18a against each of the adjacent teeth allowing more particles and waste to be dislodged from between the adjacent teeth.

Figure 5A:
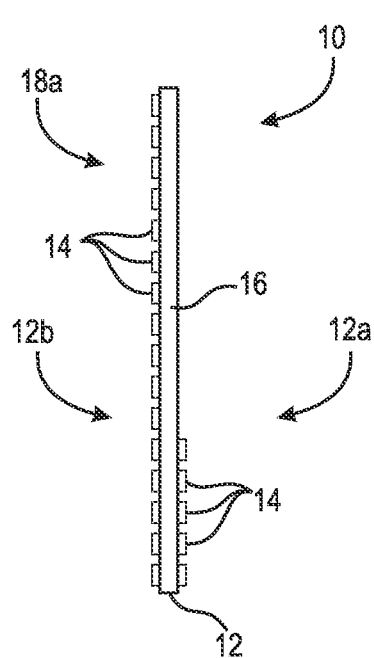
FIG. 5a is a view of the unfolded flossing device taken from the untextured handle end.
Figure 5B:
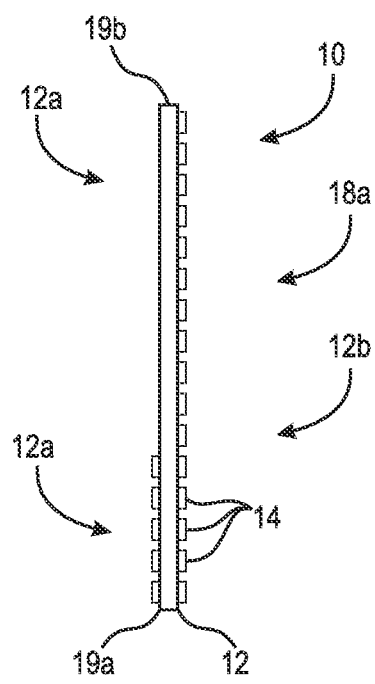
FIG. 5b is a view of the unfolded flossing device taken from the end opposing the handle.

FIG. 5a is a view of unfolded device 10 taken from end 16 which can be used as a handle, while FIG. 5b is a view of unfolded device 10 taken from the opposite end 19. Cleaning point 19a and lead point 19b are seen at the bottom and top corners, respectively, of unfolded device 10.

Figure 6A:
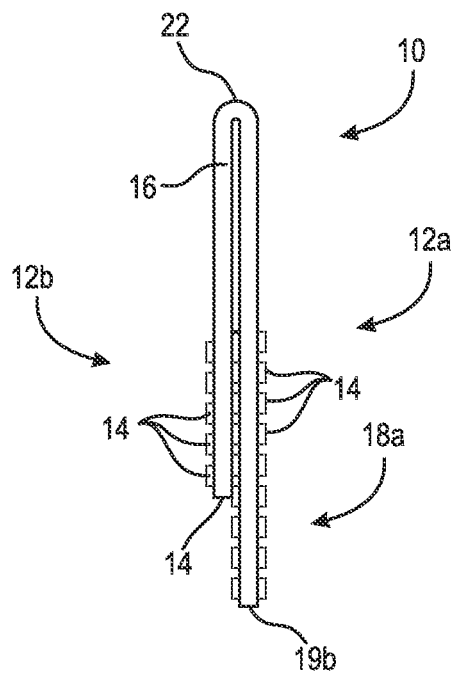
FIG. 6a is a view taken from the handle end of the flossing device folded as in in FIG. 2.
Figure 6B:
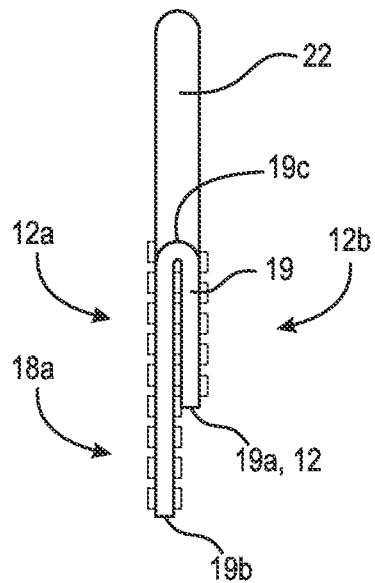
FIG. 6b shows the folded device from the opposite end with the top diagonal fold extending toward the upper following point.

FIG. 6a is taken from end 16 (the handle end) showing device 10 folded as demonstrated in FIG. 2. One end of fold 22 is shown as well as lead point 19b extending below bottom edge 12. FIG. 6b shows the folded device 10 from the opposite end with fold 22 extending on a downward slope to following point 19c. Also visible are cleaning point 19a and lead point 19b.

Figure 7:
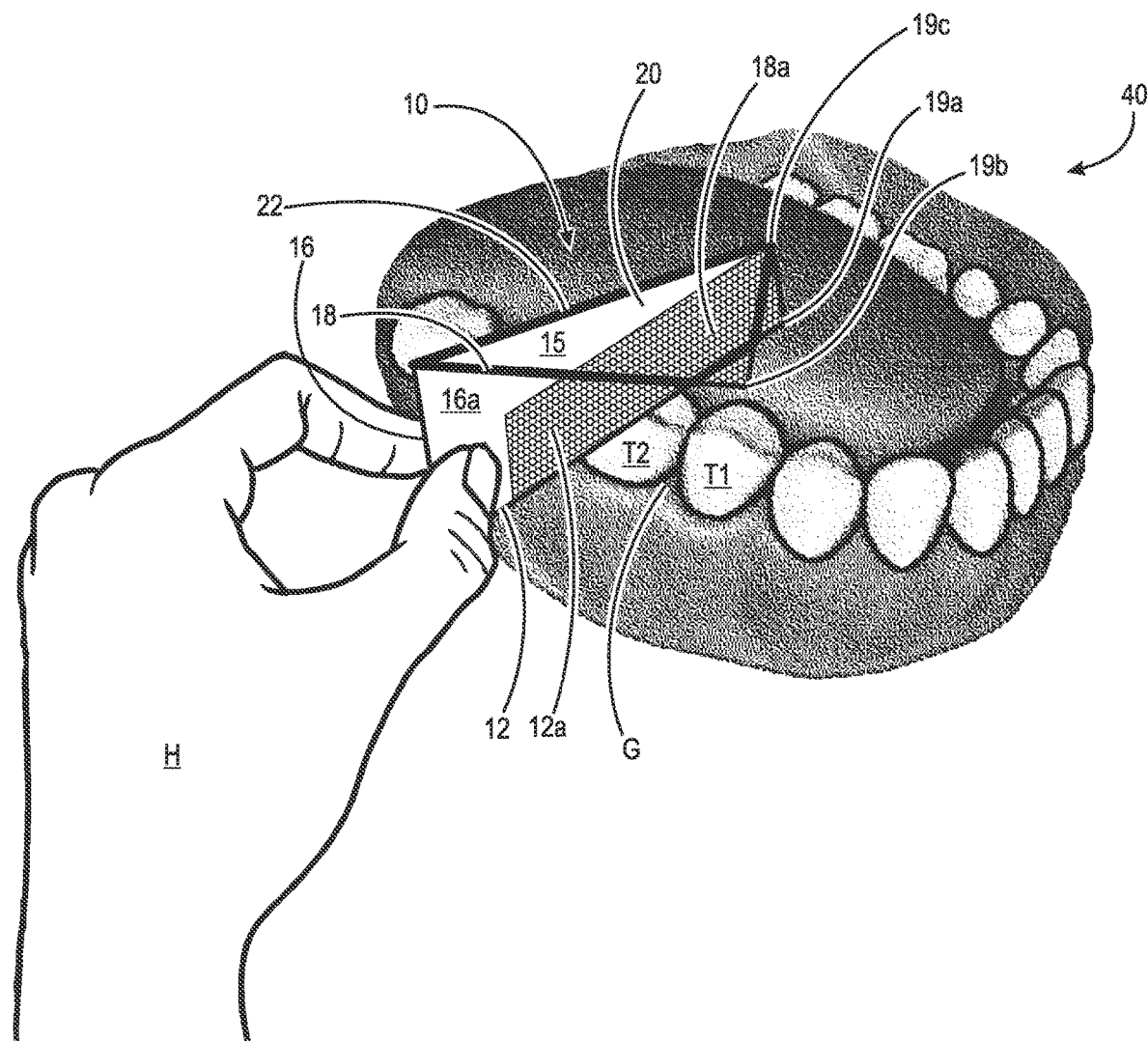
FIG. 7 is a side perspective view of a lower jaw showing a hand holding the flossing device and about to insert the device into a gap between two adjacent teeth in the lower jaw.
Figure 7A:
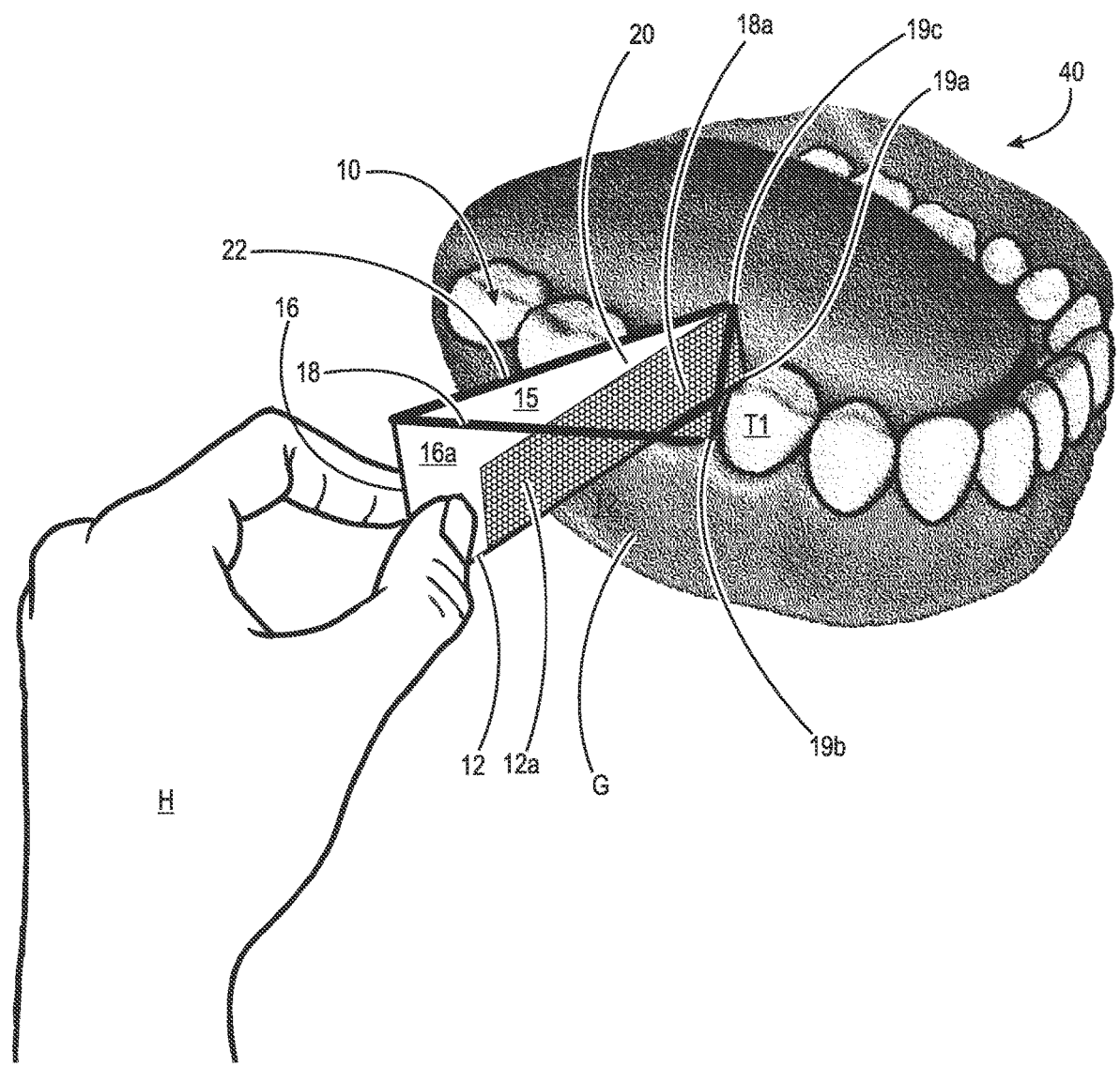
FIG. 7A depicts an alternate method of inserting the flossing device between two adjacent teeth.

FIG. 7 is a side perspective view of a lower jaw 40 showing hand H holding flossing device 10 and about to insert device 10 into gap G between teeth T1 and T2. In the view shown, device 10 is inserted between T1 and T2 by working edge 12 into gap G. Device 10 may be inserted by pushing points 19a and 19b into gap G. Points 19a and 19b are outside area 20 and are therefore thinner than that area of device 10. This will allow the user to push device 10 more easily into tight gaps with the increased thickness of region 20 creating greater friction between the textured regions 12a and 12b and enabling those regions to scrape more waste off adjacent teeth T1 and T2 which flank gap G. FIG. 7A is the same view as FIG. 7 discussed above depicting an alternate method of using device 10 in which device 10 is inserted between teeth T1 and T2 by inserting lead point 19a between those teeth.

Figure 8:
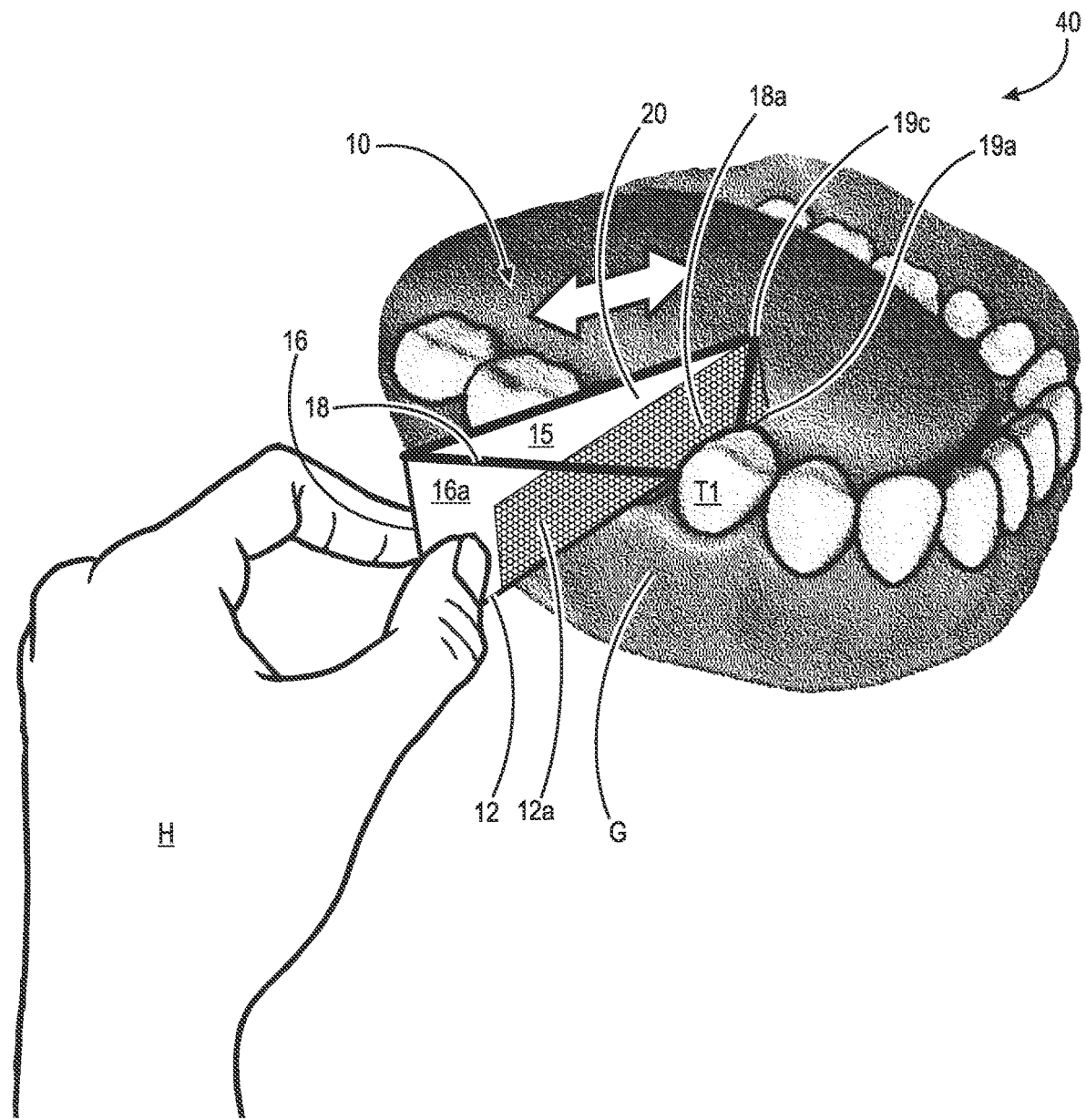
FIG. 8 is the same side perspective view of the lower jaw shown in FIG. 7 with the device inserted into the gap between the two adjacent teeth and showing the back and forth cleaning motion of the device between two adjacent teeth.

FIG. 8 is the same side perspective view of lower jaw 40 shown in FIGS. 7 and 7A with device 10 inserted into gap G. The double arrow represents the back and forth cleaning/scraping action on teeth T1 and T2 (not shown in FIG. 8) as hand H pushes and pulls device 10 within gap 40.

Figure 9:
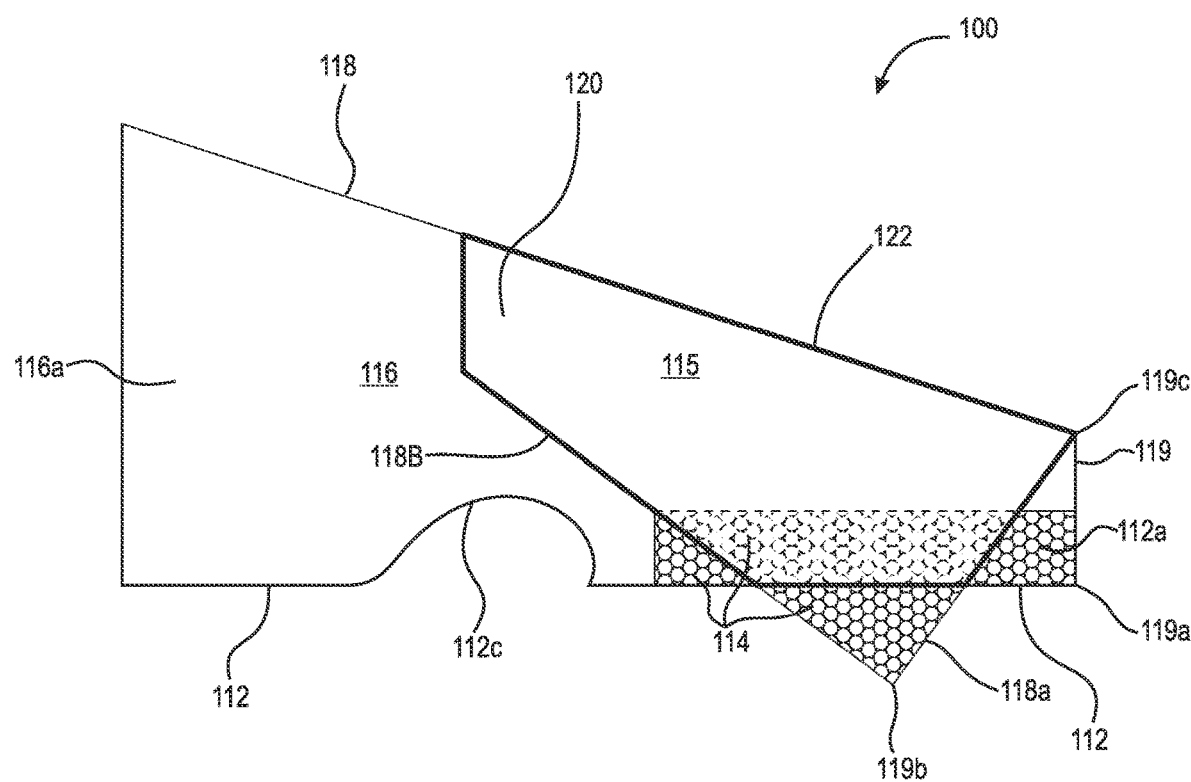
FIG. 9 is a front view of an alternate embodiment of the flossing device folded into a preferred alternate wedge-shaped embodiment of the present invention; and, FIG. 10 is side perspective view of the lower jaw shown in FIG. 7 with the alternate embodiment of the flossing device inserted into the gap between the two adjacent teeth with the groove formed in the bottom edge being used as a guide.

FIG. 9 is a front view of flossing device 100 ("device 100") folded into a preferred alternate wedge-shaped embodiment of the present invention. Generally, device 100 is similar in structure to device 10 discussed above with textured areas 112a, 112b (not seen in FIG. 9), and 118a analogous in structure and position to textured areas 12a, 12b, and 18a of device 10, respectively except as described below. Rear side 115 is folded over part of top edge 118 to form a doubled diagonal edge 122. It can be seen that textured region 118a partially covers textured region 112a to form textured cleaning point 119a and textured lead point 119b. Follow point 119c is also seen. The unfolded portion of top edge 118 extends to end 116a which opposes end 119. Similar to device 10, the bold lines depict the bounds of area 120 which, because of the folding of part of rear side 115 over top edge 118, is twice as thick as that of the remaining areas of device 100 and provides the doubled thickness that enables more efficient removal of unwanted food particles and other waste matter between adjacent teeth.

Bottom edge 112 extends between opposing side edges 116a and 119 and includes arch or groove 112c. Preferably groove 112c is outside area 120 and is therefore retains the thickness of the unfolded device 100. More preferably, groove 112 is also outside the bounds of textured region 112a in order to make the area around groove 112c as thin as possible, i.e., as thin as the untextured, unfolded portions of device 100.

Figure 10:
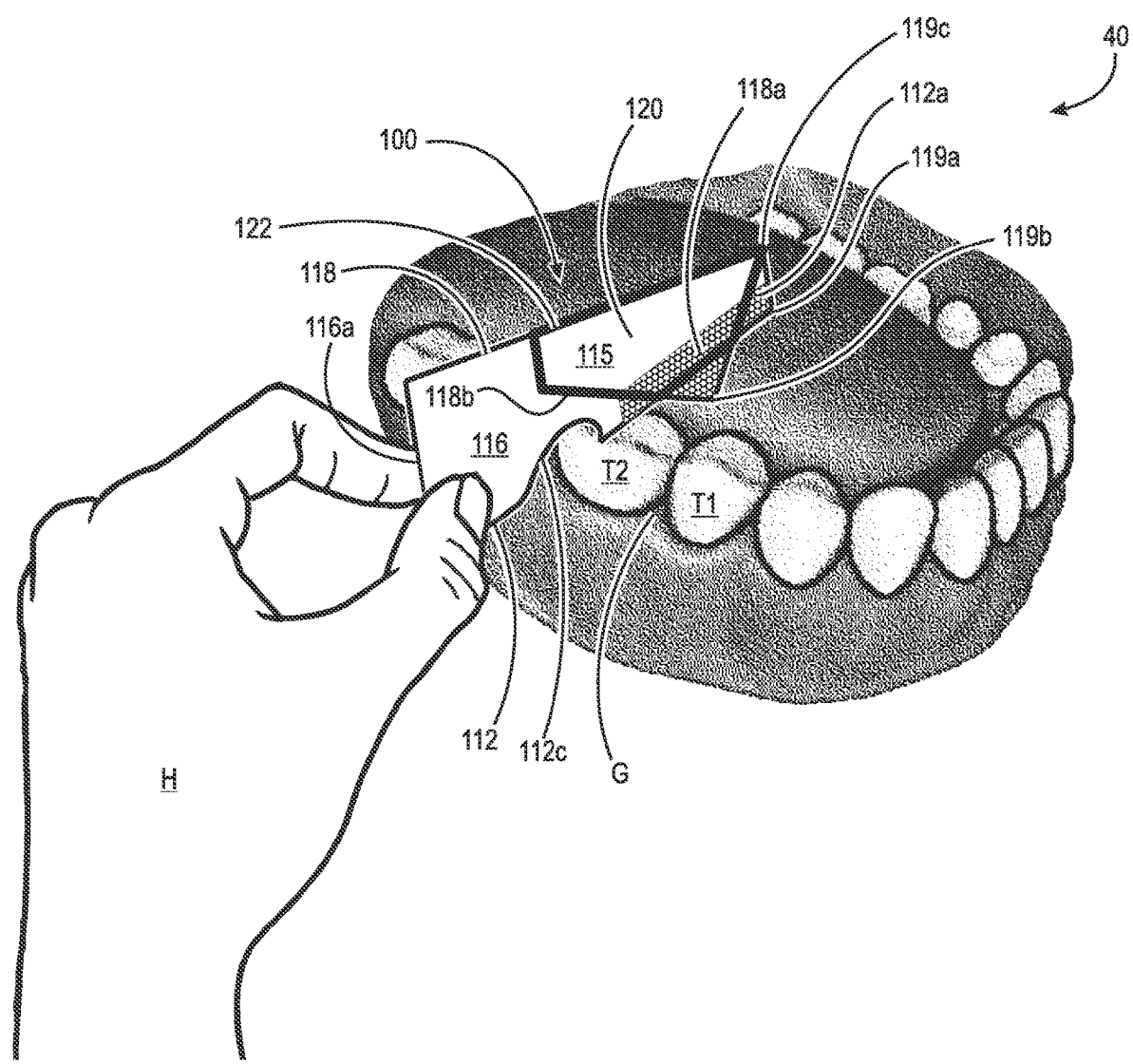

FIG. 10 depicts the use of groove 112c as a guide to enable the user to align the thinnest portion of device 100 between adjacent teeth T1 and T2 by feeling the groove portion of bottom edge 112 move into position between T1 and T2. Using this guide, the user can more easily maneuver device 100 between a narrow gap between the adjacent teeth by ensuring the thinnest portion of device 100 is the portion being positioned between adjacent teeth T1 and T2.

Wedge-shaped devices 10 and 100 may be stored in dispensing pack similar to packs for other products such as found in U.S. Design Pat. No. D423,302 to Haner, et al. which patent is incorporated by reference in its entirety.

Thus it is seen that the objects of the invention are efficiently obtained, although changes and modifications to the invention should be readily apparent to those having ordinary skill in the art, which changes would not depart from the spirit and scope of the invention as claimed.

What is claimed is:

1. A wedge-shaped teeth flossing device comprising:
   a planar body having a first thickness including:
   a first planar end;
   a second planar end opposed from the first planar end; the first and second planar ends connected by a top edge opposing a bottom edge: the bottom edge comprising a textured surface;
   a triangular shaped lead point formed at an intersection of the too edge and the second planar end, the lead point having a first thickness;
   the planar body folded on itself such that the lead point extends entirely below the bottom edge of the planar body by forming a crease in the planar body, the crease extending downwardly from the first planar end to the second planar end;
   a following point located on the second planar end at an intersection with the crease, the following point having a second thickness, thicker than the first thickness;
   a tapered top edge extending between said first planar end and said second planar end;
   a cleaning point formed at an intersection of the bottom edge and said second planar end, the cleaning point having a first thickness;
   wherein the lead point, cleaning point and following point all comprise textured surfaces; and wherein the first planar end is configured to form a non-textured gripping surface,
   an asymmetric groove recessed inward from the bottom edge.

2. The wedge-shaped tooth flossing device as recited in claim 1 wherein the crease is double the thickness of the cleaning point and the lead point.

3. The wedge-shaped tooth flossing device as recited in claim 1 wherein said first end is thicker than said second end.

4. The wedge-shaped tooth flossing device as recited in claim 1 wherein the textured surface extends onto a first side of the body from said bottom edge.

5. The wedge-shaped tooth flossing device as recited in claim 4 further comprising at least one textured region on a second side body.

6. The wedge-shaped tooth flossing device as recited in claim 1 further comprising a sticky surface extending onto a first side from said bottom edge.

7. The wedge-shaped tooth flossing device as recited in claim 6 further comprising at least one sticky region on a second side of said wedge-shaped flossing device.

8. The wedge-shaped tooth flossing device as recited in claim 1 wherein one or more of said body, said cleaning point, and said lead point includes a fluoride coating.

9. The wedge-shaped tooth flossing device as recited in claim 1 wherein wherein point is formed by an extension of said bottom edge.

10. The wedge-shaped tooth flossing device as recited in claim 1 wherein the groove includes a point at a groove end proximal to the lead point; wherein the point extends back and underneath the groove in order to guide and align the wedge shaped tooth flossing device between the teeth.

11. The wedge-shaped tooth flossing device as recited in claim 10 wherein said groove is not located in a textured region, and wherein the lead point is located in the textured region.

12. The wedge-shaped tooth flossing device as recited in claim 10 wherein said groove is not sticky.

* * * * *